(12) United States Patent
Yamanaka et al.

(10) Patent No.: US 10,186,721 B2
(45) Date of Patent: Jan. 22, 2019

(54) FUEL CELL SYSTEM

(71) Applicant: TOYOTA JIDOSHA KABUSHIKI KAISHA, Toyota-shi, Aichi-ken (JP)

(72) Inventors: Tomio Yamanaka, Nagoya (JP); Tomotaka Ishikawa, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 21 days.

(21) Appl. No.: 15/643,698

(22) Filed: Jul. 7, 2017

(65) Prior Publication Data

US 2018/0026285 A1 Jan. 25, 2018

(30) Foreign Application Priority Data

Jul. 22, 2016 (JP) .................. 2016-143856

(51) Int. Cl.
*H01M 8/04* (2016.01)
*H01M 8/04664* (2016.01)
(Continued)

(52) U.S. Cl.
CPC ..... *H01M 8/04664* (2013.01); *H01M 8/0438* (2013.01); *H01M 8/04089* (2013.01);
(Continued)

(58) Field of Classification Search
CPC ..................................................... H01M 8/04
See application file for complete search history.

(56) References Cited

U.S. PATENT DOCUMENTS

| | | |
|---|---|---|
| 2004/0159147 A1 | 8/2004 | Ueda et al. |
| 2016/0254555 A1* | 9/2016 | Chikugo ............. H01M 8/0432 |
| | | 429/446 |

FOREIGN PATENT DOCUMENTS

| | | |
|---|---|---|
| JP | 2004179072 A | 6/2004 |
| JP | 2006216478 A | 8/2006 |

(Continued)

*Primary Examiner* — Jacob B Marks
(74) *Attorney, Agent, or Firm* — Dickinson Wright, PLLC (57) ABSTRACT

There is provided a fuel cell system. The fuel cell system comprises a fuel cell configured to generate electric power using a reactive gas; a compressor configured to compress the reactive gas and feed the compressed reactive gas to the fuel cell; a flow rate measurement unit configured to measure a flow rate of the reactive gas; a pressure measurement unit configured to measure a pressure of the compressed reactive gas; a power value acquirer configured to acquire a value of electric power consumed by the compressor; and a determiner configured to perform determination with regard to an abnormality of the fuel cell system and to provide an output indicating that an abnormality occurs. When the value of electric power corresponding to a value indicating the flow rate measured by the flow rate measurement unit exceeds a first set value, the determiner provides an output indicating that an abnormality occurs in the compressor in a case of (a1) where a value of the pressure measured by the pressure measurement unit corresponding to the value indicating the flow rate measured by the flow rate measurement unit is within a set range. The determiner is also configured to provide an output indicating that an abnormality occurs on a downstream side of the compressor in a case of (a2) where the value of the pressure corresponding to the value indicating the flow rate is out of the set range. This configuration allows for discrimination between an abnormality occurring in the compressor and an abnormality occurring on the downstream side of the compressor.

3 Claims, 7 Drawing Sheets

(51) Int. Cl.
*H01M 8/04089* (2016.01)
*H01M 8/0438* (2016.01)
*H01M 8/04537* (2016.01)
*H01M 8/04746* (2016.01)

(52) U.S. Cl.
CPC ... *H01M 8/04388* (2013.01); *H01M 8/04395* (2013.01); *H01M 8/04604* (2013.01); *H01M 8/04619* (2013.01); *H01M 8/04686* (2013.01); *H01M 8/04746* (2013.01); *H01M 8/04753* (2013.01)

(56) References Cited

FOREIGN PATENT DOCUMENTS

| | | |
|---|---|---|
| JP | 2012248522 A | 12/2012 |
| WO | WO 2015-053156 * | 4/2015 |

* cited by examiner

FUEL CELL SYSTEM

CROSS-REFERENCE TO RELATED APPLICATIONS

The present application claims priority from Japanese patent application 2016-143856 filed on Jul. 22, 2016, the entirety of the content of which is hereby incorporated by reference into this application.

BACKGROUND

Field

The present disclosure relates to a fuel cell system.

Related Art

When there is an abnormality with regard to power consumption in a component included in a fuel cell system, a proposed configuration of the fuel cell system provides an output indicating that an abnormality occurs in the component.

A fuel cell system described in JP 2012-248522A includes a failure determination unit configured to determine whether an abnormality occurs in a fuel transportation system configured to transport a liquid fuel to a fuel cell. In the fuel cell system, however, even when no abnormality occurs in the fuel transportation system, the occurrence of an abnormality to block a flow path on a downstream side in a transportation direction of the fuel is likely to cause an abnormality with regard to the power consumption in the fuel transportation system. As a result of determination that an abnormality occurs in the fuel transportation system, the normal fuel transportation system without any abnormality may be replaced with a new fuel transportation system. In order to solve this problem, when there is an abnormality with regard to power consumption in a component included in the fuel cell system, there is a demand for a technique that allows for discrimination between an abnormality occurring in the component and an abnormality occurring in another part different from the component.

SUMMARY

In order to solve at least part the problems described above, the disclosure may be implemented by aspects described below.

According to one aspect of the disclosure, there is provided a fuel cell system. This fuel cell system comprises a fuel cell configured to generate electric power using a reactive gas; a compressor configured to compress the reactive gas and feed the compressed reactive gas to the fuel cell; a flow rate measurement unit configured to measure a flow rate of the reactive gas fed by the compressor; a first pressure measurement unit placed on a downstream side of the compressor in a feeding direction of the reactive gas and configured to measure a pressure of the reactive gas compressed by the compressor; a power value acquirer configured to acquire a value of electric power consumed by the compressor; and a determiner configured to perform determination with regard to an abnormality of the fuel cell system to provide an output indicating that an abnormality occurs. When the value of electric power corresponding to a value indicating the flow rate measured by the flow rate measurement unit exceeds a first set value, the determiner provides an output indicating that an abnormality occurs in the compressor in a case of (a1) where a value of the pressure measured by the first pressure measurement unit corresponding to the value indicating the flow rate is within a set range. The determiner provides an output indicating that an abnormality occurs on the downstream side of the compressor in a case of (a2) where the value of the pressure measured by the first pressure measurement unit corresponding to the value indicating the flow rate is out of the set range. When there is an abnormality with regard to the electric power consumed by the compressor, the configuration of this aspect allows for discrimination between an abnormality occurring in the compressor and an abnormality occurring on the downstream side of the compressor, based on the determination of whether the value of the pressure of the reactive gas corresponding to the value indicating the flow rate of the reactive gas is within the set range. This configuration accordingly prevents wrong determination of an abnormality occurring in the compressor.

DESCRIPTION OF EMBODIMENTS

A. First Embodiment

Figure 1:
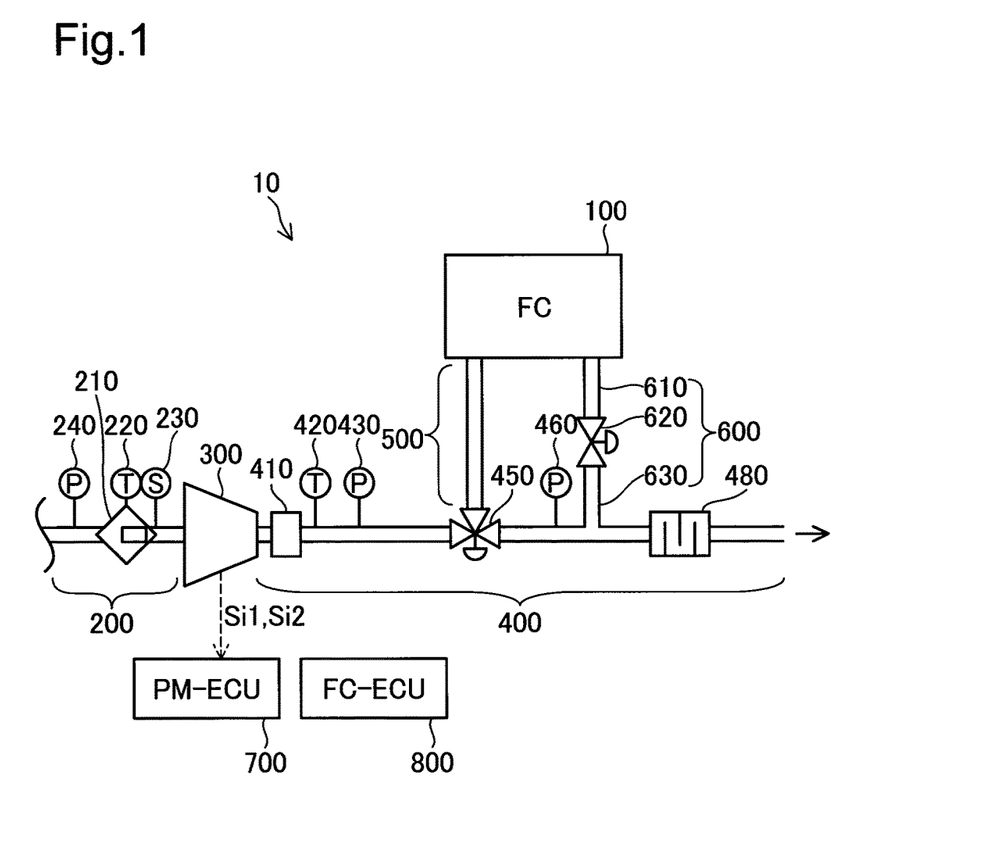
FIG. 1 is a diagram illustrating the configuration of a fuel cell system according to one embodiment.

FIG. 1 is a diagram illustrating the configuration of a fuel cell system 10 according to one embodiment of the disclosure. The fuel cell system 10 is mounted as the power source of a vehicle that is driven with a motor. The fuel cell system 10 is configured to include a fuel cell 100, an air intake flow path 200, a compressor 300, a first flow path 400, a second flow path 500, a third flow path 600, a PM-ECU 700 and an FC-ECU 800.

The fuel cell 100 has a stack structure by stacking a plurality of unit cells. Each unit cells is configured such that a membrane electrode assembly provided by forming an anode and a cathode on respective surfaces of an electrolyte membrane having proton conductivity is placed between separators. The fuel cell 100 is configured to receive supplies of hydrogen gas and the air and generate electric power by an electrochemical reaction of hydrogen and oxygen.

The air intake flow path 200 has one end connected with the compressor 300. The air intake flow path 200 is a flow passage arranged to feed the air from the atmosphere to the compressor 300. The air intake flow path 200 is provided with an air cleaner 210, an ambient temperature sensor 220, an air flowmeter 230 and an atmospheric pressure sensor 240.

The air cleaner 210 is configured to remove the dust and dirt from the air while the air flows in the air intake flow path 200. The ambient temperature sensor 220 is configured to obtain the temperature of the air taken in from the atmosphere.

The air flowmeter 230 is configured to measure a flow rate F1 of the air taken in from the atmosphere. More specifically, the air flowmeter 230 is configured to measure the flow rate F1 of the air fed by the compressor 300. The air flowmeter 230 is also configured to output a signal indicating a value of the flow rate F1 to the FC-ECU 800. The atmospheric pressure sensor 240 is configured to measure the atmospheric pressure.

The compressor 300 is configured to compress the air taken in from the atmosphere and feed the compressed air to the first flow path 400. More specifically, the compressor 300 is configured to feed the compressed air to the fuel cell 100 through the first flow path 400 and the second flow path 500. According to this embodiment, the compressor 300 is an air compressor configured to feed the air.

The first flow path 400 is a flow passage that is connected with the compressor 300 on one end thereof and is configured to discharge the air fed from the compressor 300, to the atmosphere. The second flow path 500 is a flow passage that is arranged to be branched off from the first flow path 400 and to be connected with the fuel cell 100 and is configured to feed the air fed from the compressor 300, to the fuel cell 100. The first flow path 400 is provided with an intercooler 410, a temperature sensor 420, a pressure sensor 430, a flow dividing valve 450, a pressure sensor 460 and a muffler 480.

The intercooler 410 is configured to cool down the air compressed by the compressor 300. The temperature sensor 420 is configured to detect the temperature of the air fed from the compressor 300.

The pressure sensor 430 is placed on the downstream side of the compressor 300 and on the upstream side of the flow dividing valve 450 in the air flow direction. The pressure sensor 430 is configured to measure a pressure P1 of the air compressed by the compressor 300.

The flow dividing valve 450 is placed at a branch position where the second flow path 500 is branched off from the first flow path 400. The flow dividing valve 450 is configured to divide the air compressed and fed by the compressor 300 and regulate the flow amount of the air from the branch position toward a downstream side in the first flow path 400 and the flow amount of the air from the branch position toward the second flow path 500.

The pressure sensor 460 is placed on the downstream side of the branch position in the first flow path 400 and on the upstream side of a connecting position where the third flow path 600 is connected with the first flow path 400. The pressure sensor 460 is configured to measure a pressure P2 of the air fed from the branch position toward the downstream side in the first flow path 400.

The muffler 480 is placed on the downstream side of the connecting position where the third flow path 600 is connected with the first flow path 400. The muffler 480 is configured to reduce the exhaust sound generated in the process of discharging the air to the atmosphere.

The third flow path 600 has one end connected with the fuel cell 100 and the other end connected with the downstream side of the branch position in the first flow path 400. The third flow path 600 is a flow passage configured to feed the air, as the exhaust gas from the fuel cell 100, to the first flow path 400. The third flow path 600 includes an upstream flow path 610, a pressure regulator 620 and a downstream flow path 630.

The upstream flow path 610 is a portion of the third flow path 600 that is connected with the fuel cell 100. The upstream flow path 610 is connected with the downstream flow path 630 via the pressure regulator 620. The downstream flow path 630 is a portion of the third flow path 600 that is connected with the first flow path 400.

The pressure regulator 620 is an electromagnetically-driven pressure regulator configured to regulate the amount of the exhaust gas that is flowed from the fuel cell 100 to the first flow path 400. The pressure regulator 620 is placed between the upstream flow path 610 and the downstream flow path 630 in the third flow path 600 and is configured to open and close the third flow path 600.

The PM-ECU 700 is a power management electronic control unit. The PM-ECU 700 is configured to obtain a power value V indicating a power consumed by the compressor 300 using a value of a signal Si1 output from a torque sensor (not shown) and a value of a signal Si2 output from a compressor rotation speed sensor (not shown) provided in the compressor 300. The PM-ECU 700 is also configured to output a signal indicating the obtained power value V to the FC-ECU 800.

The FC-ECU 800 is a controller configured to receive signals output from various sensors provided in the fuel cell system 10 and to control the operations of the respective components of the fuel cell system 10. The FC-ECU 800 is configured by a microcomputer including a CPU, a RAM and a ROM.

When the power value V corresponding to the value indicating the flow rate F1 exceeds a first set value, the FC-ECU 800 is configured to provide an output indicating that an abnormality occurs in the compressor 300 in the case of (a1) where the value of the pressure P1 corresponding to the value indicating the flow rate F1 is within a set range.

When the power value V corresponding to the value indicating the flow rate F1 exceeds the first set value, the FC-ECU 800 is configured to provide an output indicating that an abnormality occurs on the downstream side of the compressor 300 in the case of (a2) where the value of the pressure P1 corresponding to the value indicating the flow rate F1 is out of the set range.

The FC-ECU 800 does not provide the output indicating the occurrence of an abnormality, when the power value V corresponding to the value indicating the flow rate F1 does not exceed the first set value.

The power value V corresponding to the value indicating the flow rate F1 denotes a power value V indicating the consumed power during the flow at the flow rate F1. For example, the flow rate F1 increases with an increase in the rotation speed of the compressor 300 that is caused by an increase in the power value V indicating the power consumed by the compressor 300. The flow rate F1 decreases with a decrease in the rotation speed of the compressor 300 that is caused by a decrease in the power value V indicating the power consumed by the compressor 300. The power value V corresponding to the value indicating the flow rate F1 thus denotes the power value V determined according to the flow rate F1.

According to this embodiment, the first set value is a value calculated at regular intervals from the value indicating the flow rate F1 using an equation experimentally determined to show a relationship between the flow rate F1 and the power value V in the normal state of the compressor 300. The first set value is a value determined by adding a fixed value to the power value V indicating the power consumed during the flow at the flow rate F1 in the normal state of the compressor 300. According to another embodiment, the first set value may be computed, based on map values stored in advance in the FC-ECU 800.

The value of the pressure P1 corresponding to the value indicating the flow rate F1 denotes a value of the pressure P1 measured by the pressure sensor 430 with regard to the air compressed by the compressor 300 and fed to the first flow path 400 at the flow rate F1. For example, the pressure P1 increases with an increase in the flow rate F1. The pressure P1 decreases with a decrease in the flow rate F1.

Figure 2:
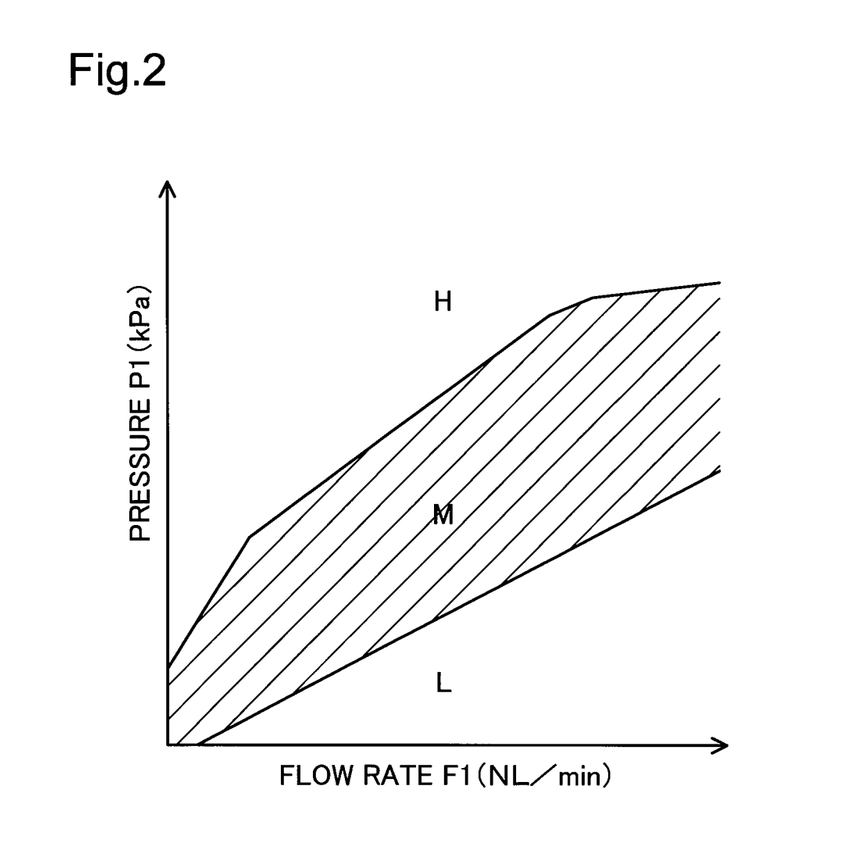
FIG. 2 is a diagram showing a set range with regard to the value of a pressure corresponding to the value indicating a flow rate.

FIG. 2 is a diagram showing the set range with regard to the value of the pressure P1 corresponding to the value indicating the flow rate F1. The graph of FIG. 2 shows the flow rate F1 as abscissa. The graph of FIG. 2 shows the pressure P1 as ordinate.

In the graph of FIG. 2, a set range M indicates the set range with regard to the value of the pressure P1 corresponding to the value indicating the flow rate F1. The set range M denotes a range set according to an equation determined experimentally from a relationship between the flow rate F1 and the pressure P1 in the normal state of the compressor 300. In the graph of FIG. 2, a range H and a range L respectively show ranges out of the set range M with regard to the value of the pressure P1 corresponding to the value indicating the flow rate F1.

When the power value V corresponding to the value indicating the flow rate F1 exceeds the first set value, the FC-ECU 800 provides the output indicating that an abnormality occurs in the compressor 300 or provides the output indicating that an abnormality occurs on the downstream side of the compressor 300, based on whether the value of the pressure P1 corresponding to the value indicating the flow rate F1 is within or out of the set range M. According to this embodiment, when an output is provided to indicate that an abnormality occurs in any of the components constituting the fuel cell system 10, the occurrence of the abnormality is informed by displaying the output on a liquid crystal display placed near to the driver's seat of the vehicle equipped with the fuel cell system 10. According to another embodiment, the abnormality may be informed by an audio output using an alarm device.

Figure 3:
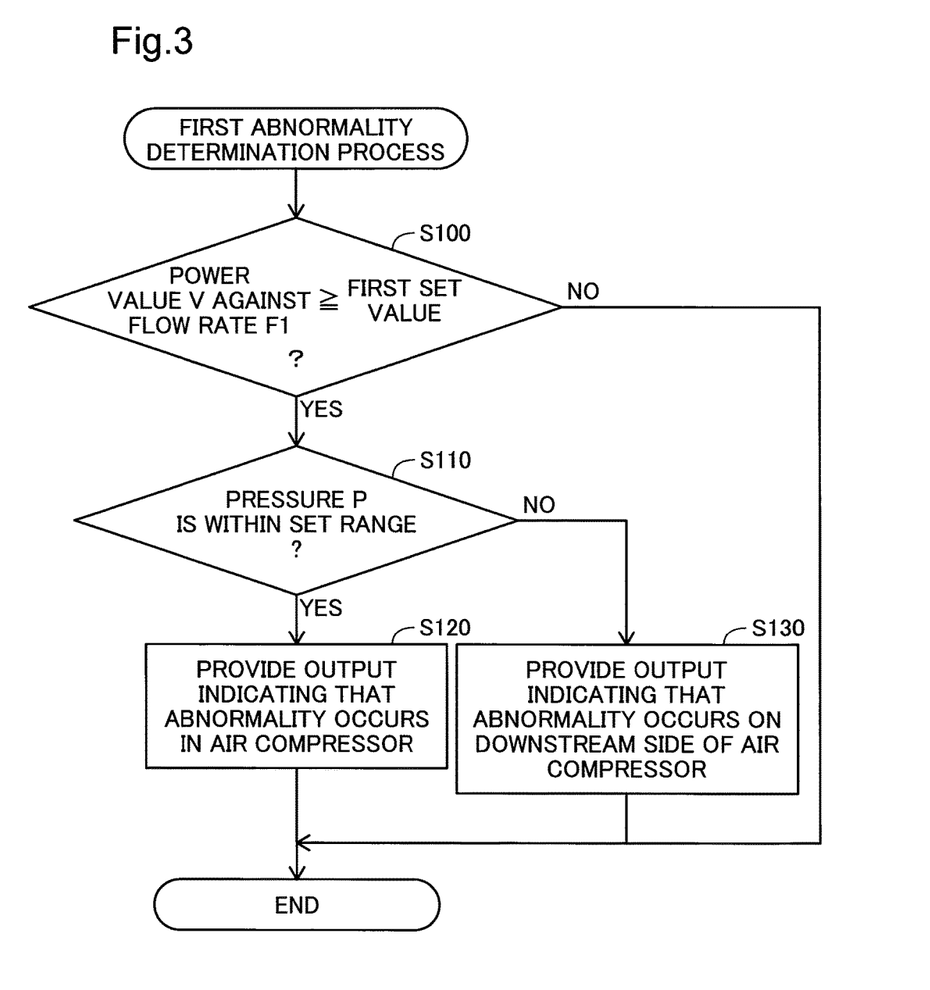
FIG. 3 is a flowchart showing a first abnormality determination process performed by the fuel cell system.

FIG. 3 is a flowchart showing a first abnormality determination process performed by the fuel cell system 10. The fuel cell system 10 performs the first abnormality determination process at regular interval during the operation of the compressor 300.

When the first abnormality determination process is triggered, the FC-ECU 800 first determines whether the power value V corresponding to the value indicating the flow rate F1 exceeds the first set value (step S100). In the fuel cell system 10 of the embodiment, when a time duration of the condition that the power value V corresponding to the value indicating the flow rate F1 exceeds the first set value reaches 5 seconds in 10 seconds since a start of the processing of step S100, the FC-ECU 800 determines that the power value V corresponding to the value indicating the flow rate F1 exceeds the first set value. In the fuel cell system 10 of the embodiment, when the time duration of the condition that the power value V corresponding to the value indicating the flow rate F1 exceeds the first set value does not reach 5 seconds in 10 seconds since the start of the processing of step S100, on the other hand, the FC-ECU 800 determines that the power value V corresponding to the value indicating the flow rate F1 does not exceed the first set value.

When it is determined that the power value V against the value indicating the flow rate F1 does not exceed the first set value (step S100: NO), the first abnormality determination process of FIG. 3 is terminated.

When it is determined that the power value V corresponding to the value indicating the flow rate F1 exceeds the first set value (step S100: YES), on the other hand, the FC-ECU 800 subsequently determines whether the value of the pressure P1 corresponding to the value indicating the flow rate F1 is within or out of the set range M (step S110). In the fuel cell system 10 of the embodiment, when an integrated time of the condition that the value of the pressure P1 corresponding to the value indicating the flow rate F1 is out of the set range M is less than 4 seconds in 10 seconds since the start of the processing of step S100, the FC-ECU 800 determines that the value of the pressure P1 corresponding to the value indicating the flow rate F1 is within the set range M. In the fuel cell system 10 of the embodiment, when the integrated time of the condition that the value of the pressure P1 corresponding to the value indicating the flow rate F1 is out of the set range M is equal to or greater than 4 seconds in 10 seconds since the start of the processing of step S100, on the other hand, the FC-ECU 800 determines that the value of the pressure P1 corresponding to the value indicating the flow rate F1 is out of the set range M.

When it is determined that the value of the pressure P1 corresponding to the value indicating the flow rate F1 is within the set range M (step S110: YES), the FC-ECU 800 provides an output indicating that an abnormality occurs in the compressor 300 (step S120). The first abnormality determination process of FIG. 3 is then terminated.

When it is determined that the value of the pressure P1 corresponding to the value indicating the flow rate F1 is out of the set range M (step S110: NO), on the other hand, the FC-ECU 800 provides an output indicating that an abnormality occurs on the downstream side of the compressor 300 (step S130). The first abnormality determination process of FIG. 3 is then terminated.

Figure 4:
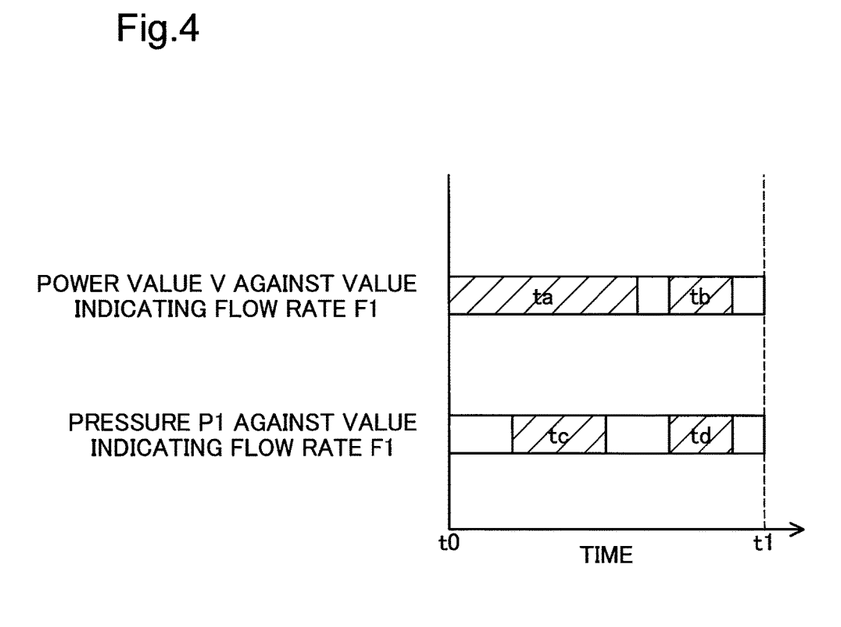
FIG. 4 is a diagram illustrating an example of determination of a power value corresponding to the value indicating the flow rate and determination of the value of the pressure corresponding to the value indicating the flow rate.

FIG. 4 is a diagram illustrating an example of determination of the power value V corresponding to the value indicating the flow rate F1 and determination of the value of the pressure P1 corresponding to the value indicating the flow rate F1. The graph of FIG. 4 shows time as abscissa.

In the graph of FIG. 4, an upper bar shows whether the power value V corresponding to the value indicating the flow rate F1 exceeds the first set value, in the form of time zones. Hatched portions are time zones when the power value V corresponding to the value indicating the flow rate F1 exceeds the first set value. Non-hatched portions are time zones when the power value V corresponding to the value indicating the flow rate F1 does not exceed the first set value.

In the graph of FIG. 4, a lower bar shows whether the value of the pressure P1 corresponding to the value indicating the flow rate F1 is within or out of the set range M, in the form of time zones. Hatched portions are time zones when the value of the pressure P1 corresponding to the value indicating the flow rate F1 is out of the set range M. Non-hatched portions are time zones when the value of the pressure P1 corresponding to the value indicating the flow rate F1 is within the set range M.

A time period from a timing t0 to a timing t1 in FIG. 4 is 10 seconds in the fuel cell system 10 of the embodiment. A hatched portion ta in FIG. 4 is 6 seconds. A hatched portion tb in FIG. 4 is 2 seconds. A hatched portion tc in FIG. 4 is 3 seconds. A hatched portion td in FIG. 4 is 2 seconds.

At the timing t0, when the processing of step S100 is started to determine whether the power value V corresponding to the value indicating the flow rate 1 exceeds the first set value, measurement of the time duration of the condition that the power value V corresponding to the value indicating the flow rate F1 exceeds the first set value is started. Since the hatched portion ta is 6 seconds in the time period from the timing t0 to the timing t1, the time duration of the condition that the power value V corresponding to the value indicating the flow rate F1 exceeds the first set value reaches 5 seconds. It is thus determined that the power value V corresponding to the value indicating the flow rate F1 exceeds the first set value (corresponding to step S100: YES according to this embodiment).

In the time period from the timing t0 to the timing t1, measurement of the integrated time with regard to the value of the pressure P1 corresponding to the value indicating the flow rate F1 is also started for the determination of step S110. Since the integrated time of the hatched portion tc and the hatched portion td is 5 seconds in the time period from the timing t0 to the timing t1, it is determined that the value of the pressure P1 corresponding to the value indicating the flow rate F1 is out of the set range M (corresponding to step S110: NO according to this embodiment).

When the output indicating that an abnormality occurs on the downstream side of the compressor 300 is provided (corresponding to step S130 according to this embodiment), the flow dividing valve 450 is arranged to close the second flow path 500-side and open the downstream side of the branch position in the first flow path 400, the pressure regulator 620 is closed, and the air is flowed at a set flow rate F2 from the compressor 300, the FC-ECU 800 is configured to provide an output indicating that an abnormality occurs in the first flow path 400 in the case of (b1) where a difference between the value of the pressure P1 and the value of the pressure P2 (i.e., pressure loss in the first flow path 400) exceeds a second set value.

When the output indicating that an abnormality occurs on the downstream side of the compressor 300 is provided (corresponding to step S130 according to this embodiment), the flow dividing valve 450 is arranged to close the second flow path 500-side and open the downstream side of the branch position in the first flow path 400, the pressure regulator 620 is closed, and the air is flowed at a set flow rate F2 from the compressor 300, the FC-ECU 800 is configured to provide an output indicating that an abnormality occurs in at least one of the second flow path 500, a flow path of the air provided in the fuel cell 100 and the upstream flow path 610 in the case of (b2) where the difference between the value of the pressure P1 and the value of the pressure P2 does not exceed the second set value.

The state that the flow dividing valve 450 is arranged to close the second flow path 500-side is not limited to the state that the flow dividing valve 450 is arranged to fully close the second flow path 500-side but includes the state that the flow dividing valve 450 is arranged to set zero to an effective sectional area that causes the air to be flowed toward the second flow path 500-side. The state that the pressure regulator 620 is closed is not limited to the state that the pressure regulator 620 is arranged to fully close the third flow path 600 but includes the state that the pressure regulator 620 is arranged to set zero to an effective sectional area that causes the air to be flowed from the upstream flow path 610 to the downstream flow path 630 in the third flow path 600.

According to this embodiment, the second set value is a value calculated at regular intervals from the value indicating the flow rate F2 using an equation experimentally determined to show a relationship between the flow rate F2 and the pressure loss in the first flow path 400 in the normal state of the first flow path 400. According to another embodiment, the second set value may be computed, based on map values stored in advance in the FC-ECU 800.

Figure 5:
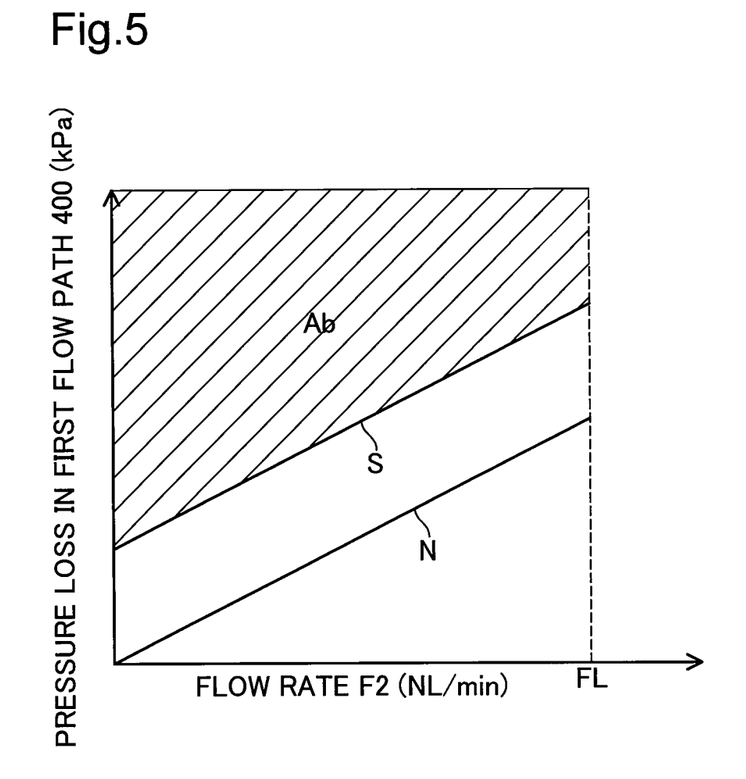
FIG. 5 is a diagram showing map values indicating a relationship between a flow rate and a pressure loss in a first flow path.

FIG. 5 is a diagram showing map values indicating the relationship between the flow rate F2 and the pressure loss in the first flow path 400 in the fuel cell system 10 of the embodiment. The diagram of FIG. 5 shows the pressure loss in the first flow path 400 as ordinate. The diagram of FIG. 5 shows the set flow rate F2 of the air fed from the compressor 300 as abscissa.

A solid line curve N in FIG. 5 shows a variation in pressure loss in the first flow path 400 corresponding to the flow rate F2 in the normal state of the first flow path 400. A solid line curve S in FIG. 5 shows a variation of the second set value. The solid line curve S has the same slope as that of the solid line curve N and is set by adding a fixed value to the solid line curve N.

A range Ab in FIG. 5 is a range in which the pressure loss in the first flow path 400 corresponding to the flow rate F2 exceeds the second set value. A flow rate FL in FIG. 5 indicates an upper limit of the flow rate F2 in the range Ab. When the flow rate F2 exceeds the flow rate FL, the flow of the air in the first flow path 400 is changed from a laminar flow region to a turbulence flow region. This leads to a failure of approximation of the pressure loss in the first flow path 400 corresponding to the flow rate F2 by a linear curve like the solid line curve N. Accordingly the upper limit of the flow rate F2 in the range Ab is set to the flow rate FL.

Figure 6:
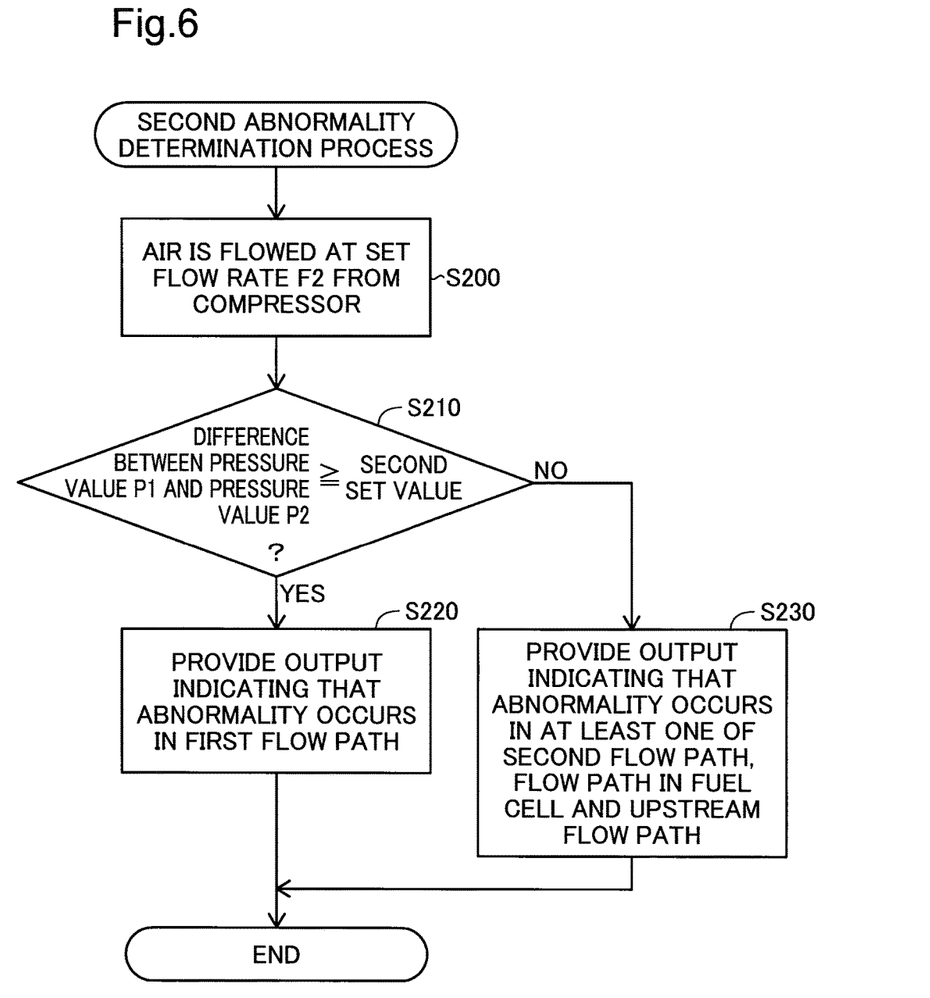
FIG. 6 is a flowchart showing a second abnormality determination process performed by the fuel cell system.

FIG. 6 is a flowchart showing a second abnormality determination process performed by the fuel cell system 10. The fuel cell system 10 performs the second abnormality determination process at regular intervals in the state of no power generation by the fuel cell 100 when the FC-ECU 800 provides the output indicating that an abnormality occurs on the downstream side of the compressor 300 (corresponding to step S130 according to this embodiment). The state of no power generation by the fuel cell 100 means the state that the air is not fed to the fuel cell 100 since the flow dividing valve 450 is arranged to close the second flow path 500-side and open the downstream side of the branch position in the first flow path 400 and the pressure regulator 620 is closed.

When the second abnormality determination process is triggered, the air is flowed from the compressor 300 at the set flow rate F2 (step S200). The FC-ECU 800 subsequently determines whether the difference between the value of the pressure P1 and the value of the pressure P2 exceeds the second set value (step S210). In the fuel cell system 10 of the embodiment, when an integrated time of the condition that the difference between the value of the pressure P1 and the value of the pressure P2 exceeds the second set value is less than 4 seconds in 10 seconds since a start of the processing of step S210, the FC-ECU 800 determines that the difference between the value of the pressure P1 and the value of the pressure P2 does not exceed the second set value. In the fuel cell system 10 of the embodiment, when the integrated time of the condition that the difference between the value of the pressure P1 and the value of the pressure P2 exceeds the second set value is equal to or greater than 4 seconds in 10 seconds since the start of the processing of step S210, on the other hand, the FC-ECU 800 determines that the difference between the value of the pressure P1 and the value of the pressure P2 exceeds the second set value.

When it is determined that the difference between the value of the pressure P1 and the value of the pressure P2 exceeds the second set value, the FC-ECU 800 provides an output indicating that an abnormality occurs in the first flow path 400 (step S220). The second abnormality determination process of FIG. 6 is then terminated.

When it is determined that the difference between the value of the pressure P1 and the value of the pressure P2 does not exceed the second set value, on the other hand, the FC-ECU 800 provides an output indicating that an abnormality occurs in at least one of the second flow path 500, the flow path of the air provided in the fuel cell 100 and the upstream flow path 610 (step S230). The second abnormality determination process of FIG. 6 is then terminated.

When there is an abnormality with regard to the electric power consumed by the compressor 300, the configuration of the embodiment described above allows for discrimination between an abnormality occurring in the compressor 300 and an abnormality occurring on the downstream side of the compressor 300, based on the determination of whether the value of the pressure P1 of the reactive gas corresponding to the value indicating the flow rate F1 of the air is within the set range M. This configuration accordingly prevents wrong determination of an abnormality occurring in the compressor 300.

Furthermore, with regard to the abnormality occurring on the downstream side of the compressor 300, the configuration of the embodiment allows for discrimination between an abnormality occurring in the first flow path 400 and an abnormality occurring in at least one of the second flow path 500, the flow path of the air provided in the fuel cell 100 and the upstream flow path 610, based on the determination of whether the difference between the value of the pressure P1 and the value of the pressure P2 exceeds the second set value.

B. Second Embodiment

Figure 7:
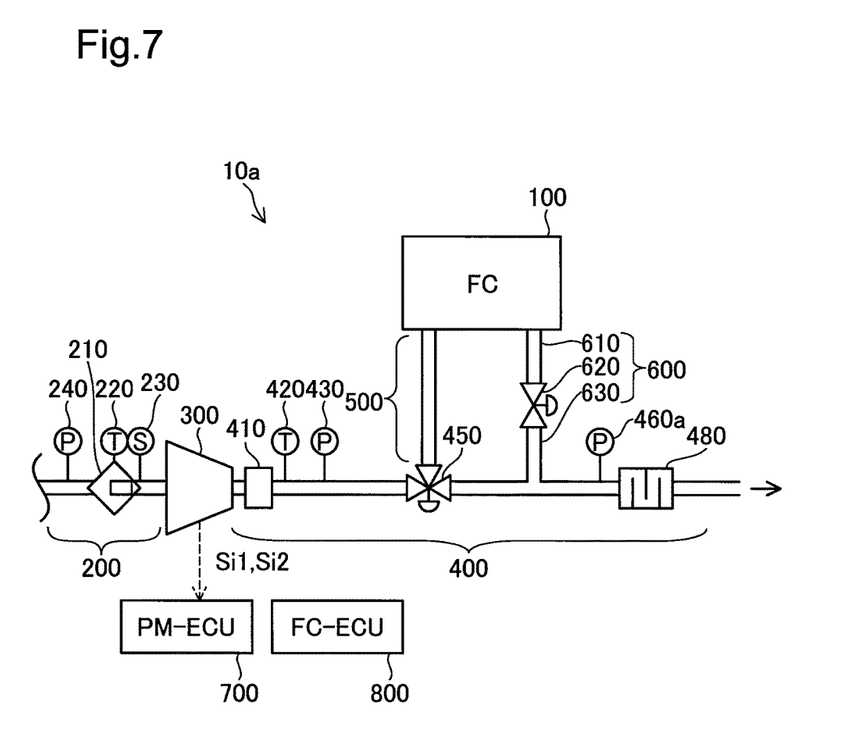
FIG. 7 is a diagram illustrating the configuration of a fuel cell system according to another embodiment.

FIG. 7 is a diagram illustrating the configuration of a fuel cell system 10a according to a second embodiment. The fuel cell system 10a of the second embodiment differs from the fuel cell system 10 of the first embodiment by that the pressure sensor 460 is replaced by a pressure sensor 460a placed at a different position from that of the pressure sensor 460 but otherwise has a similar configuration to that of the fuel cell system 10 of the first embodiment.

The pressure sensor 460a is placed on the downstream side of the connecting position where the third flow path 600 is connected with the first flow path 400. The pressure sensor 460a is configured to measure a pressure P3 of the air fed from the connecting position to the downstream side in the first flow path 400. The fuel cell system 10a performs the second abnormality determination process, based on the determination of whether a difference between the value of the pressure P1 and the value of the pressure P3 exceeds the second set value.

This configuration enables an abnormality occurring in the first flow path 400 to be detected in a wider range, compared with the configuration that the pressure sensor is placed on the upstream side of the connecting position where the third flow path 600 is connected with the first flow path 400.

C. Modifications

According to the first embodiment described above, the PM-ECU 700 obtains the power value V indicating the power consumed by the compressor 300 using the value of the signal output from the torque sensor provided in the compressor 300 and the value of the signal output from the compressor rotation speed sensor. The present disclosure is, however, not limited to this configuration. According to a modification, for example, the PM-ECU 700 may obtain the power value V indicating the power consumed by the compressor 300 using the value of a signal output from a power sensor provided in the compressor 300.

According to the first embodiment described above, the determinations are performed based on the time duration and the integrated time in 10 seconds since the start of the processing of step S100. The present disclosure is, however, not limited to this configuration. According to a modification, for example, the determinations may be performed based on only a time duration in a predetermined time period since the start of the processing of step S100. In another example, the determination may be performed based on only an integrated time in a predetermined time period since the start of the processing of step S100. According to another modification, the determination may be performed based on both a time duration and an integrated time in a time period between the last operation of the fuel cell system 10 and a start of the processing of step S100.

According to the first embodiment described above, measurements are performed simultaneously for the same 10 seconds with regard to both the power value V corresponding to the value indicating the flow rate F1 and the pressure P1 corresponding to the value indicating the flow rate F1. The present disclosure is, however, not limited to this configuration. According to a modification, for example, measurement with regard to the pressure P1 corresponding to the value indicating the flow rate F1 may be started after completion of measurement and determination with regard to the power value V corresponding to the value indicating the flow rate F1.

Both the first abnormality determination process and the second abnormality determination process are performed in the first embodiment described above. The present disclosure is, however, not limited to this configuration. According to a modification, for example, the fuel cell system may be configured to perform only the first abnormality determination process.

The disclosure is not limited to any of the embodiments, the examples, and the modifications described above but may be implemented by a diversity of other configurations without departing from the scope of the disclosure. For example, the technical features of any of the embodiments, the examples and the modifications may be replaced or combined appropriately, in order to solve part or all of the problems described above or in order to achieve part or all of the advantageous effects described above. Any of the technical features may be omitted appropriately unless the technical feature is described as essential herein. The present disclosure may be implemented by aspects described below.

(1) According to one aspect of the disclosure, there is provided a fuel cell system. This fuel cell system comprises a fuel cell configured to generate electric power using a reactive gas; a compressor configured to compress the reactive gas and feed the compressed reactive gas to the fuel cell; a flow rate measurement unit configured to measure a flow rate of the reactive gas fed by the compressor; a first pressure measurement unit placed on a downstream side of the compressor in a feeding direction of the reactive gas and configured to measure a pressure of the reactive gas compressed by the compressor; a power value acquirer configured to acquire a value of electric power consumed by the compressor; and a determiner configured to perform determination with regard to an abnormality of the fuel cell system and to provide an output indicating that an abnormality occurs. When the value of electric power corresponding to a value indicating the flow rate measured by the flow rate measurement unit exceeds a first set value, the determiner provides an output indicating that an abnormality occurs in the compressor in a case of (a1) where a value of the pressure measured by the first pressure measurement unit corresponding to the value indicating the flow rate is within a set range. The determiner provides an output indicating that an abnormality occurs on the downstream side of the compressor in a case of (a2) where the value of the pressure measured by the first pressure measurement unit corresponding to the value indicating the flow rate is out of the set range. When there is an abnormality with regard to the electric power consumed by the compressor, the configuration of this aspect allows for discrimination between an abnormality occurring in the compressor and an abnormality occurring on the downstream side of the compressor, based on the determination of whether the value of the pressure of the reactive gas corresponding to the value indicating the flow rate of the reactive gas is within the set range. This configuration accordingly prevents wrong determination of an abnormality occurring in the compressor.

(2) The fuel cell system of the above aspect may further comprise a first flow path connected with the compressor on one end thereof and configured to discharge the reactive gas compressed and fed by the compressor, to the atmosphere; a second flow path arranged to be branched off from the first flow path and to be connected with the fuel cell and configured to feed the reactive gas compressed and fed by the compressor, to the fuel cell; a flow dividing valve placed at a branch position where the second flow path is branched off from the first flow path and configured to divide a flow of the reactive gas compressed and fed by the compressor and regulate an amount of a flow division toward a first side that is a downstream side of the branch position in the first flow path and an amount of a flow division toward a second side that is a second flow path side of the branch position; a third flow path connected with the fuel cell on one end thereof and with the first side of the first flow path on the other end thereof and configured to feed an exhaust gas from the fuel cell, to the first flow path; and a second pressure measurement unit placed on the first side of the first flow path and configured to measure a pressure of the reactive gas fed toward the first side. The first pressure measurement unit may be placed on an upstream side of the flow dividing valve in the feeding direction of the reactive gas. The third flow path may be provided with a pressure regulator configured to open and close the third flow path. When the flow dividing valve is arranged to close the second side and open the first side, the pressure regulator is closed and the reactive gas is flowed at a predetermined flow rate from the compressor in the case of the (a2), the determiner may be configured to provide an output indicating that an abnormality occurs in at least one of the first flow path and a partial flow path on a first flow path side of the pressure regulator in the third flow path in a case of (b1) where a difference between a value of the pressure measured by the first pressure measurement unit and a value of the pressure measured by the second pressure measurement unit exceeds a second set value. The determiner may be configured to provide an output indicating that an abnormality occurs in at least one of the second flow path, a flow path of the reactive gas provided in the fuel cell and a partial flow path on a fuel cell side of the pressure regulator in the third flow path in a case of (b2) where the difference between the value of the pressure measured by the first pressure measurement unit and the value of the pressure measured by the second pressure measurement unit does not exceed the second set value. With regard to the abnormality occurring on the downstream side of the compressor, the configuration of this aspect allows for discrimination between an abnormality occurring in the first flow path and an abnormality occurring in at least one of the second flow path, the flow path of the reactive gas provided in the fuel cell and the partial flow path on the fuel cell side of the pressure regulator in the third flow path, based on the determination of whether the difference between the value of the pressure measured by the first pressure measurement unit and the value of the pressure measured by the second pressure measurement unit exceeds the second set value.

(3) In the fuel cell system of the above aspect, the second pressure measurement unit may be placed on a downstream side of a connecting position where the third flow path is connected with the first flow path. This configuration enables an abnormality occurring in the first flow path to be detected in a wider range, compared with a configuration that the second pressure measurement unit is placed on an upstream side of the connecting position where the third flow path is connected with the first flow path.

The present disclosure is not limited to the aspects of the fuel cell system described above but may be implemented by any of various other aspects, for example, a fuel cell system mounted on a vehicle or a marine vessel that is driven with electric power as the power source, such a vehicle or such a marine vehicle. The present disclosure may also be implemented by a computer program configured to implement such a fuel cell system, such a vehicle or such a marine vehicle. The present disclosure is not limited to any of the aspects described above but may be implemented by a diversity of other aspects without departing from the scope of the disclosure.

What is claimed is:
1. A fuel cell system, comprising:
a fuel cell configured to generate electric power using a reactive gas;
a compressor configured to compress the reactive gas and feed the compressed reactive gas to the fuel cell;
a flow rate measurement unit configured to measure a flow rate of the reactive gas fed by the compressor;
a first pressure measurement unit placed on a downstream side of the compressor in a feeding direction of the reactive gas and configured to measure a pressure of the reactive gas compressed by the compressor;
a power value acquirer configured to acquire a value of electric power consumed by the compressor; and
a determiner configured to perform determination with regard to an abnormality of the fuel cell system and to provide an output indicating that an abnormality occurs, wherein
when the value of electric power corresponding to a value indicating the flow rate measured by the flow rate measurement unit exceeds a first set value,
the determiner provides an output indicating that an abnormality occurs in the compressor in a case of (a1) where a value of the pressure measured by the first pressure measurement unit corresponding to the value indicating the flow rate is within a set range, and
the determiner provides an output indicating that an abnormality occurs on the downstream side of the compressor in a case of (a2) where the value of the pressure measured by the first pressure measurement unit corresponding to the value indicating the flow rate is out of the set range.

2. The fuel cell system according to claim 1, further comprising:
- a first flow path connected with the compressor on one end thereof and configured to discharge the reactive gas compressed and fed by the compressor, to the atmosphere;
- a second flow path arranged to be branched off from the first flow path and to be connected with the fuel cell and configured to feed the reactive gas compressed and fed by the compressor, to the fuel cell;
- a flow dividing valve placed at a branch position where the second flow path is branched off from the first flow path and configured to divide a flow of the reactive gas compressed and fed by the compressor and regulate an amount of a flow division toward a first side that is a downstream side of the branch position in the first flow path and an amount of a flow division toward a second side that is a second flow path side of the branch position;
- a third flow path connected with the fuel cell on one end thereof and with the first side of the first flow path on the other end thereof and configured to feed an exhaust gas from the fuel cell, to the first flow path; and
- a second pressure measurement unit placed on the first side of the first flow path and configured to measure a pressure of the reactive gas fed toward the first side, wherein the first pressure measurement unit is placed on an upstream side of the flow dividing valve in the feeding direction of the reactive gas, and the third flow path is provided with a pressure regulator configured to open and close the third flow path, wherein when the flow dividing valve is arranged to close the second side and open the first side, the pressure regulator is closed and the reactive gas is flowed at a predetermined flow rate from the compressor in the case of the (a2),

- the determiner provides an output indicating that an abnormality occurs in at least one of the first flow path and a partial flow path on a first flow path side of the pressure regulator in the third flow path in a case of (b1) where a difference between a value of the pressure measured by the first pressure measurement unit and a value of the pressure measured by the second pressure measurement unit exceeds a second set value, and
- the determiner provides an output indicating that an abnormality occurs in at least one of the second flow path, a flow path of the reactive gas provided in the fuel cell and a partial flow path on a fuel cell side of the pressure regulator in the third flow path in a case of (b2) where the difference between the value of the pressure measured by the first pressure measurement unit and the value of the pressure measured by the second pressure measurement unit does not exceed the second set value.

3. The fuel cell system according to claim 2, wherein the second pressure measurement unit is placed on a downstream side of a connecting position where the third flow path is connected with the first flow path.

* * * * *